Oct. 24, 1933.                C. KRAUCH ET AL                1,931,550
      CONVERSION OF SOLID FUELS AND PRODUCTS DERIVED THEREFROM
           OR OTHER MATERIALS INTO VALUABLE LIQUIDS
                     Filed July 29, 1932
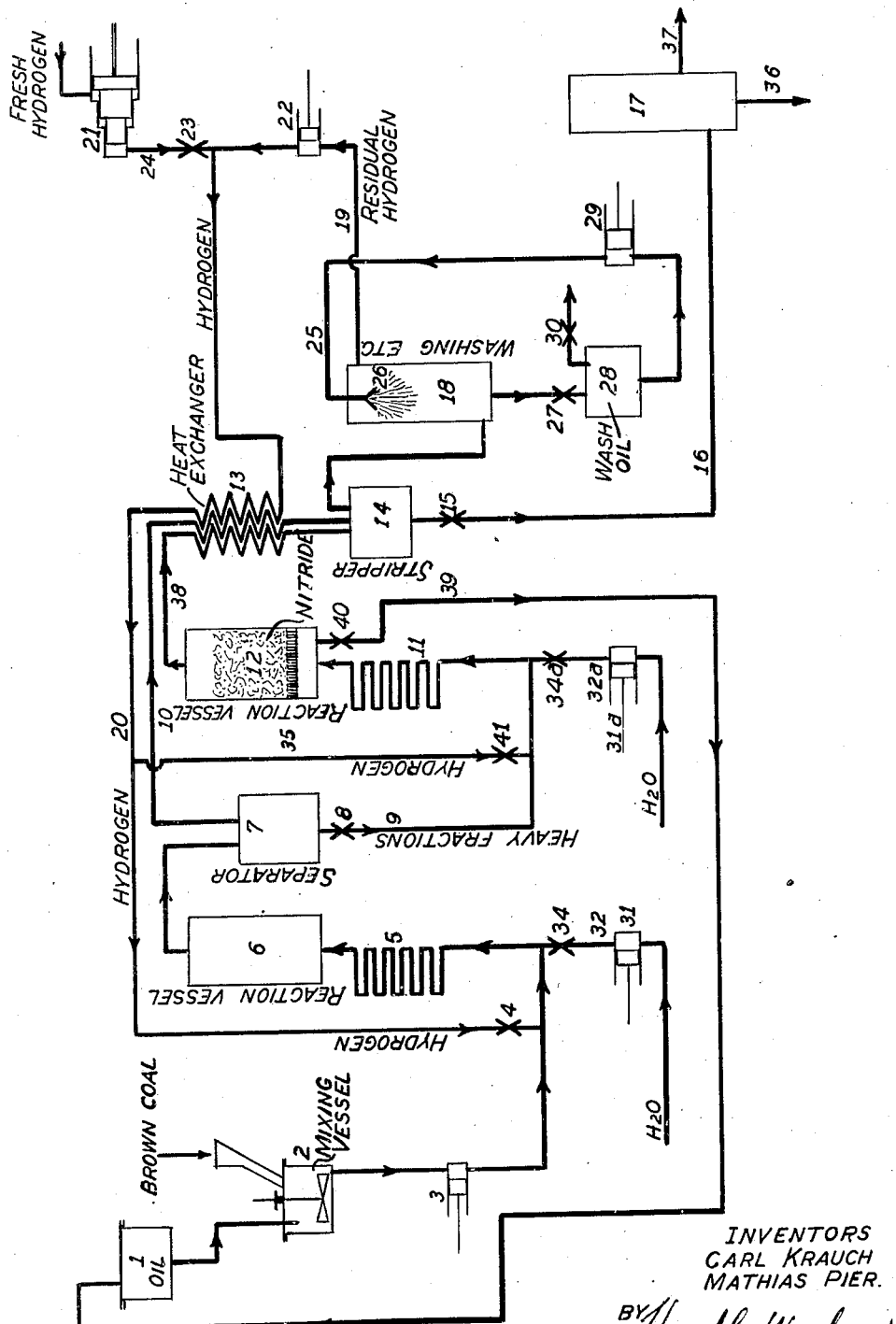
INVENTORS
CARL KRAUCH
MATHIAS PIER.
ATTORNEYS.

Patented Oct. 24, 1933

1,931,550

UNITED STATES PATENT OFFICE 1,931,550

CONVERSION OF SOLID FUELS AND PRODUCTS DERIVED THEREFROM OR OTHER MATERIALS INTO VALUABLE LIQUIDS

Carl Krauch, Ludwigshafen-on-the-Rhine, and Mathias Pier, Heidelberg, Germany, assignors to Standard-I. G. Company, Linden, N. J., a corporation of Delaware Application July 29, 1932, Serial No. 625,649, and in Germany February 14, 1925

20 Claims. (Cl. 196—53)

Our invention relates to the destructive hydrogenation of carbonaceous materials and, in particular, to that process which is carried out in the presence of a catalyst immune to sulphur poisoning as described and claimed in our co-pending application Ser. No. 86,646, of which this application is a continuation in part.

The object of our invention is to provide a catalyst which will act efficiently in the promotion of the conversion of carbonaceous substances into valuable liquids by destructive hydrogenation.

In our application Ser. No. 86,646, it is stated that nitrides are suitable as catalysts immune to sulphur poisoning. It is the utilization of this group of materials as catalysts in the destructive hydrogenation process that is the subject matter of this invention. Of the said nitrides in particular those which are stable in the presence of water come into question, but also nitrides unstable to water may be employed.

The most valuable nitrides contemplated by the present invention are those of titanium, silicon, vanadium, cerium, manganese, iron, molybdenum, tungsten, chromium and uranium. Of these the nitrides of chromium, cerium, vanadium, titanium, silicon and uranium may be said to be stable to water under the conditions of working employed in our process, the nitrides of manganese and tungsten are somewhat less stable, the nitride of molybdenum is still less stable, and the nitrides of iron and other metals are unstable. We have found that these nitrides are suitable for use in this process either singly or in combination with each other or in combination with other materials; such as, other compounds of nitrogen; compounds containing combined sulphur, particularly sulphides of heavy metals; metals of the sixth group of the periodic system or compounds thereof; compounds of silver, copper, cadmium, lead, bismuth and tin; lithium oxide or carbonate; magnesite; boric acid; alumina; rare earths; oxides and carbonates of zinc, manganese and vanadium; oxides of metals of the fourth group of the periodic system such as titanium oxide, thorium oxide or stannous oxide; and difficultly reducible oxides of other metals.

The said catalysts may be added in any suitable manner. They may be added to the solid or liquid material, or in the case of liquids they may be placed into the reaction vessel and the liquids brought into contact with them in a vaporized or otherwise finely divided state. Other bodies, for example, lumps of brick, quartz, asbestos, coke, active carbon, silica gel, metals, especially heavy metals, or metal oxides, or carbides, or mixtures of such bodies, may also be present in the reaction chamber. The said bodies have the effect of avoiding the formation of carbon deposits and of facilitating the distribution of the hydrogenating gas.

As regards the materials to be treated, the invention can be applied to any sort of solid fuel, for example, hard or soft coal, brown coal, lignite, peat, wood, or similar materials, mineral oils, shale oils, or other solid or liquid bitumina, also distillation or extraction products of all of them, such as tars obtained therefrom, whether by ordinary destructive distillation or by low temperature carbonization, or brown coal bitumen, or tars or oils obtained by pressure hydrogenation of solid or liquid fuels, or components or conversion products of all the above-mentioned materials, such as, cracked products, cumarone or any other resins or residues of their distillation, pitch, asphaltum and so on, or mixtures of several such products with each other, also of solids with the above-named liquids or of one or more of such products with other suitable organic liquids.

Especially when employing coal or liquid fuels, an addition of lignite or peat is often of advantage, often increasing the hydrogenizing action, avoiding several drawbacks and in the case of solid substances rendering their introduction easier. All the said materials may be used in the presence of substantial amounts of water and, if desired, water may be added as such usually in amount about ten per cent by weight of the initial carbonaceous material. Sometimes the process of hydrogenation is hereby furthered by reason of the fact that the water lowers the partial pressure of the hydrocarbons and improves the hydrogenation thereof. For example, lignite producer tar containing from 40 to 50 per cent of water may be used to advantage directly.

The preferred form of carrying out the process is generally a continuous operation with a stream of the gases and with an excess thereof over the required quantity and preferably while maintaining the desired pressure by adding fresh gas and passing the gas either by circulation through one or more reaction vessels or through a succession of several reaction vessels. The material to be converted is supplied at a proper place and the products are separated from the reaction gases by cooling.

We further discovered that the process according to the present invention is in many cases, and in particular when converting solid fuels or heavy oils or residues, greatly improved by carrying out the process in two parts or stages. In the first stage the coal, tars or heavy petroleum products are converted into liquids poor in fractions of low boiling point by liquefaction or destructive hydrogenation with or without catalysts, while in the second stage the products of stage one are transformed into hydrocarbons of low boiling point, by destructive hydrogenation, but preferably with the aid of catalysts. Increased pressure is preferably employed in one or both stages. Insofar as catalytic masses are added in both stages, they may be of the same kind or different in quantity, concentration, or kind. The two stages can be effected in two separate or adjoining reaction vessels or in different parts of a single vessel constructed in a suitable manner. Even more than two stages may be employed successively in certain cases.

The gases serving for the reaction may consist of hydrogen alone or of mixtures containing hydrogen, for example a mixture of hydrogen with nitrogen, or water gas, or hydrogen mixed with carbon dioxide, hydrogen sulphide, water vapor or methane or other hydrocarbons. Or the hydrogen may be generated in the reaction chamber by the interaction of water and carbon monoxide, and by similar reactions. When employing nitrogen compounds as catalysts, and carbon monoxide and water, the gas must be employed in a stream.

The process is best carried out under elevated or even strongly elevated pressure and most suitably with a stream of the gas passed through or over the material to be treated or carrying it along through the reaction vessel by which method the production obtained by the process is very large.

Depending on the conditions of working, for example, temperature and pressure employed or duration of the treatment, the products are poor or rich in products of low boiling point. Generally the temperature ranges between 300° and 700° C., and the pressure, when used, should amount to at least 20 atmospheres, and should, preferably, be much higher up to about 2000 atmospheres.

In the following examples the time of reaction varies considerably, as might be supposed, depending on the nature of the raw material, the activity of the catalyst, temperature, pressure and the like. In practice it is desirable to make a few preliminary runs in order to determine the time required for the best yields under a given set of conditions. Generally speaking, with batch operations the total time may be from two to ten hours or more, depending on the yield desired, while with continuous operations the time is usually shorter. When continually feeding liquid or difficultly vaporizable oils, the rate of flow may be in the neighborhood of .3 to .8 volume of oil per hour per volume of reaction space. Vaporous materials may be treated at higher temperatures and the feed rate may consequently be one or even one and one-half volumes per hour per volume of reaction space. The volume of hydrogen may likewise vary considerably and should always, of course, be in excess of that actually required for the conversion; for example, the rate of flow of hydrogen may be in excess of about 600 liters per kilogram of carbonaceous material.

The practical method of carrying out our process is best illustrated by reference to the accompanying drawing which illustrates in skeleton form the apparatus employed for operation in two stages and which bears suitable legends for describing the process. For operation in a single stage a similar apparatus is used except that one reaction vessel is employed.

Finely ground brown coal is made into a paste in the mixing vessel 2 with oil from tank 1 and is thereafter forced by means of pump 3 together with hydrogen, which is supplied from conduit 20, through the pre-heater 5 into the reaction vessel 6. The regulation of the amount of hydrogen necessary for the conversion is effected by means of valve 4. The separation of the solid and liquid and gaseous and vaporous portions of the product leaving reaction vessel 6 takes place in the separator 7. The gaseous and vaporous portions of the product leave the vessel 7 through pipe 10, pass through heat exchanger 13 wherein they impart their heat to incoming hydrogen and then enter stripper 14 where the normally liquid products are separated and conducted through pipe 16 controlled by valve 15 into storage tank 17. The normally gaseous products containing hydrogen are conducted to the washing tower 18 where the hydrocarbons are washed out by means of the wash oil which is circulated through the washing tower 18 where it is sprayed by nozzle 26. The purified hydrogen leaves tower 18 by pipe 19 and is pumped by pump 22 back into conduit 20 for further use in the process. Fresh hydrogen may be introduced into pipe 20 by means of pump 21 and pipe 24 provided with valve 23. The normally gaseous hydrocarbons removed by the wash oil leave tank 28 through pipe 30. The heavier liquid and solid hydrocarbons resulting from the reaction in vessel 6 are drawn off from separator 7 through a pipe 9 carrying a valve 8. Hydrogen is supplied to pipe 9 through pipe 35 from conduit 20 and the amount of hydrogen required is controlled by valve 41 in pipe 35. The mixed heavy materials and hydrogen pass through the preheater 11 into reaction vessel 12 which is filled with a solid inorganic nitride. The gaseous and vaporous products of the reaction in vessel 12 pass off through pipe 38 through heat exchanger 13 into the stripper 14 from which point they pass through the same series of operations as the products leaving vessel 7 through pipe 10 as described above. The residual oily and solid materials left in vessel 12 can be drawn off through pipe 39 by release of the valve 40 and returned to the initial oil tank 1.

In the event that a catalyst is used in the first stage, it is preferably mixed in a finely divided state with the initial materials in vessel 2, but it can be employed in the same manner in which it is employed in vessel 12.

In case the conversion is to be made in the presence of water vapor, water is introduced by means of pumps 31 and 31a, respectively, into reaction vessels 6 and 12, respectively. The regulation of the necessary amount of water is effected by means of valves 34 and 34a, respectively. The water evaporates in the pre-heaters 5 and 11, is condensed in the heat exchanger 13 and collected at the bottom of tank 17. From there it may be drawn off through conduit 36, whereas the benzine is removed through a pipe 37 positioned at a higher level in the tank.

The following examples will serve to further explain how our invention is carried out in practice, but we do not restrict our invention to these examples.

Example 1

Dark-colored residues of American rock oil, which at ordinary temperature are nearly solid and have a strongly unsaturated character, are incorporated with an excess of hydrogen, with or without an addition of free ammonia, and passed in a continous manner over titanium nitride at a pressure of 200 atmospheres and a temperature from 450° to 500° C. The product which is formed is a slightly yellowish liquid of .8 sp. gr., more or less, which on distillation yields about 50 per cent of gasoline boiling up to 150° C. and of saturated character; up to 250° C. an additional 28 per cent of distillate is obtained and at 325° C. a slightly colored residue is obtained of vaseline character.

The same results are produced when silicon nitride is used instead of titanium nitride. As pointed out before, other substances having a catalytic action can be mixed with the nitrides.

Example 2

Brown coal tar obtained in a gas producer is continually passed, with an excess of hydrogen, at about 500° C. and under 200 atmospheres pressure over a catalyst containing silicon or titanium nitride, or both, with or without an addition of other substances, such as difficultly reducible oxides or sulphides. The tar is converted, by this treatment, into a mobile oil, practically free from phenol, of a saturated nature, and containing about 50 per cent of benzine (boiling up to about 150° C.). The fractions of higher boiling point are free from asphaltum and can be converted into benzine by repeating the treatment.

Example 3

A vessel capable of withstanding high pressure is charged with pieces of titanium nitride, or manganese nitride, or chromium nitride, and heated to about 500° C. Hydrogen saturated with the vapors of dehydrated brown coal producer tar at a low partial pressure, and containing, if desired, a quantity of ammonia, is passed over the nitride under a pressure of 200 atmospheres. When the gases leaving the vessel are cooled, a product containing about 70 per cent of its weight of gasoline boiling up to 200° C. is obtained. The product is practically free from oxygenated and unsaturated compounds. The residual gas mixture may be returned to the reaction vessel after replacing the consumed hydrogen.

Mixtures of coals and tars or of coal or tar with products of the hydrogenation of such materials or with other suitable liquid diluents may also be employed.

Example 4

Brown coal is intimately mixed with 1 per cent of its weight of a mixture of molybdic acid and silicon nitride and introduced into a vessel capable of withstanding high pressure, in which it is treated at about 500° C. and under a pressure of 150 atmospheres with a stream of hydrogen. The coal is soon and nearly completely transformed into valuable thin hydrocarbons.

Example 5

Raw cresylic acid obtained from coal tar is passed along with a current of hydrogen over titanium nitride or vanadium nitride under a pressure of 50 atmospheres and at a temperature of about 500° to 550° C. whereby it is rapidly and completely converted into hydrocarbons.

Example 6

Brown coal producer tar is continuously passed in a current of hydrogen under a pressure of 800 atmospheres and at a temperature of about 500° C. over a catalyst containing a compound of silver and silicon nitride. The resulting gases yield, on cooling, a product containing about 50 per cent of gasoline.

Our invention is not confined to the above examples; the conditions may be widely varied in various directions. For example, the pressures and temperatures may be higher or lower than stated above.

In the appended claims, the expression "distillation and extraction products thereof" is intended to relate only to solid and liquid distillation and extraction products and is not to be construed to include normally gaseous products of the distillation of solid and liquid fuels.

What we claim is:

1. The process of destructively hydrogenizing carbonaceous substances, such as solid and liquid fuels, distillation and extraction products thereof, which comprises treating them with hydrogen in the presence of a solid inorganic nitride, and heat at a temperature between about 300 and 700° C., and at a pressure of at least 20 atmospheres.

2. The process of destructively hydrogenizing carbonaceous substances, such as solid and liquid fuels, distillation and extraction products thereof, which comprises treating them with hydrogen, in the presence of a solid inorganic nitride stable against the action of water and of a substantial amount of water, and heat at a temperature between about 300° and 700° C. and at a pressure of at least 20 atmospheres.

3. The process of converting carbonaceous substances, such as solid and liquid fuels, distillation and extraction products thereof, into valuable liquids which comprises treating them with hydrogen, in the presence of a solid inorganic nitride stable against the action of water, and heat at a temperature of between about 300° and 700° C. and at a pressure of at least 20 atmospheres.

4. The process of converting carbonaceous substances, such as solid and liquid fuels, distillation and extraction products thereof, into valuable liquids which comprises treating them with hydrogen, in the presence of a solid inorganic nitride stable against the action of water, and heat at a temperature of between about 300° and 700° C. and at a pressure of at least 20 atmospheres, the conditions of working, such as temperature, pressure and efficiency of the catalyst, being so adapted to each other as to give rise to the formation of substantial amounts of low boiling hydrocarbons of a gasoline character.

5. The process of converting carbonaceous substances, such as solid and liquid fuels, distillation and extraction products thereof, into valuable liquids which comprises treating them with hydrogen, in the presence of a solid inorganic nitride stable against the action of water, and heat at a temperature of between about 300° and 700° C. and at a pressure of at least 100 atmospheres.

6. The process of converting carbonaceous substances, such as solid and liquid fuels, distillation and extraction products thereof, into valuable liquids which comprises treating them with a stream of hydrogen, in the presence of a solid inorganic nitride stable against the action of water, and heat at a temperature of between about 300° and 700° C. and at an elevated pressure of at least 20 atmospheres.

7. The process of producing liquids from solid fuel materials which comprises destructively hydrogenating the initial material, in the presence of a solid inorganic nitride stable against the action of water, at a pressure of at least 20 atmospheres and at a temperature of between about 300° and 700° C.

8. The process of producing liquid hydrocarbons from coaly material which comprises destructively hydrogenating the initial material in the presence of a solid inorganic nitride stable against the action of water, at a pressure of at least 20 atmospheres and at a temperature of between about 300° and 700° C.

9. The process of producing liquid hydrocarbons from lignite which comprises destructively hydrogenating the initial material in the presence of a solid inorganic nitride stable against the action of water, at a pressure of at least 20 atmospheres and at a temperature of between about 300° and 700° C.

10. The process of converting carbonaceous substances, such as solid and liquid fuels, distillation and extraction products thereof, into valuable liquids which comprises treating them with a continuous stream of hydrogen and a substantial amount of water and heat at a temperature of between about 300° and 700° C. and at a pressure of at least 50 atmospheres in the presence of a solid inorganic nitride stable against the action of water.

11. The process of converting carbonaceous substances, such as solid and liquid fuels, distillation and extraction products thereof, into valuable liquids which comprises treating a mixture of one of said substances with another of said substances of more recent geological age than the first by destructive hydrogenation in the presence of a solid inorganic nitride stable against the action of water, under a pressure of at least 20 atmospheres and at a temperature of between about 300° and 700° C.

12. The process of destructively hydrogenizing carbonaceous substances, such as solid and liquid fuels, distillation and extraction products thereof, containing asphaltic hydrocarbons, into valuable liquids which comprises treating them with hydrogen in the presence of a solid inorganic nitride stable against the action of water, at a temperature between about 300° and 700° C. and at a pressure of at least 20 atmospheres for a period such that, under the conditions as above given, the product is substantially free from asphalt.

13. The process of converting carbonaceous substances such as solid and liquid fuels, distillation and extraction products thereof, into valuable liquids which comprises continuously feeding said substances with hydrogen into a reaction space containing a solid inorganic nitride stable against the action of water and held at a temperature of between about 300° and 700° C. while maintaining a pressure of at least 20 atmospheres in said space and continuously removing resulting products.

14. The process of converting carbonaceous substances such as solid and liquid fuels, distillation and extraction products thereof, into valuable liquids which comprises treating them with a stream of hydrogen in the presence of a solid inorganic nitride stable against the action of water, and heat at a temperature of between about 300° and 700° C. and at a pressure of at least 20 atmospheres and carrying off resulting products in the vapor state in the stream of hydrogen.

15. The process of destructively hydrogenizing carbonaceous substances such as solid and liquid fuels, distillation and extraction products thereof, into valuable liquids which comprises treating them with a stream of hydrogen in the presence of a solid inorganic nitride stable against the action of water, and heat at a temperature between about 300° and 700° C. and at a pressure of at least 20 atmospheres, carrying off resulting products in the vapor state in the stream of hydrogen and cooling the mixed vapors whereby the liquefiable portions of the said products are substantially completely removed from the hydrogen.

16. The process of producing liquids from solid fuel materials which comprises destructively hydrogenating the intial material in the presence of added nitrides of metals in group six at a pressure of at least 50 atmospheres and at a temperature of between about 350° and 450° C.

17. The process of converting carbonaceous substances, such as solid and liquid fuels, distillation and extraction products thereof, into valuable liquids which comprises treating them with hydrogen in the presence of manganese nitride at a temperature between about 300° and 700° C. and under a pressure of at least 20 atmospheres.

18. The process of converting carbonaceous substances, such as solid and liquid fuels, distillation and extraction products thereof, into valuable liquids which comprises treating them with hydrogen in the presence of vanadium nitride at a temperature between about 300° and 700° C. and under a pressure of at least 20 atmospheres.

19. The process of converting carbonaceous substances, such as solid and liquid fuels, distillation and extraction products thereof, into valuable liquids which comprises treating them with hydrogen in the presence of a nitride of a metal of group 6 of the periodic system at a temperature between about 300° and 700° C. and under a pressure of at least 20 atmospheres.

20. The process of converting carbonaceous substances, such as solid and liquid fuels, distillation and extraction products thereof, into valuable liquids which comprises treating them with hydrogen in the presence of chromium nitride at a temperature between about 300° and 700° C. and under a pressure of at least 20 atmospheres.

CARL KRAUCH.
MATHIAS PIER.